(12) United States Patent
Spielmann et al.

(10) Patent No.: US 8,919,808 B2
(45) Date of Patent: Dec. 30, 2014

(54) STROLLER, ESPECIALLY REHAB STROLLER

(75) Inventors: Christian Spielmann, Arnstadt (DE); Jürgen Sonderhüsken, Hamm (DE)

(73) Assignee: Otto Bock Mobility Solutions GmbH, Konigsee (DE)

( * ) Notice: Subject to any disclaimer, the term of this patent is extended or adjusted under 35 U.S.C. 154(b) by 106 days.

(21) Appl. No.: 13/618,424

(22) Filed: Sep. 14, 2012

(65) Prior Publication Data

US 2013/0069343 A1 Mar. 21, 2013

(30) Foreign Application Priority Data

Sep. 14, 2011 (DE) .......................... 10 2011 116 098

(51) Int. Cl.
*B62B 7/06* (2006.01)
*B62B 9/10* (2006.01)

(52) U.S. Cl.
CPC . *B62B 7/06* (2013.01); *B62B 9/104* (2013.01); *B62B 2205/20* (2013.01); *B62B 9/102* (2013.01)
USPC ............................ 280/650; 280/658; 280/647

(58) Field of Classification Search
CPC .......... B62B 7/14; B62B 7/142; B62B 7/145; B62B 7/147; B62B 9/22; B62B 9/102; B62B 9/104; B62B 2205/20; A61G 5/1075
See application file for complete search history.

(56) References Cited

U.S. PATENT DOCUMENTS

| 4,072,318 | A | * | 2/1978 | Laune ............................. 280/42 |
| 4,892,327 | A | * | 1/1990 | Cabagnero ..................... 280/650 |
| 5,028,061 | A | * | 7/1991 | Hawkes ........................ 280/47.4 |
| 5,246,272 | A | * | 9/1993 | Kato et al. ..................... 297/364 |
| 6,086,086 | A | * | 7/2000 | Hanson et al. ................. 280/650 |
| 6,176,507 | B1 | * | 1/2001 | Bigo et al. ..................... 280/647 |
| 6,270,111 | B1 | * | 8/2001 | Hanson et al. ................. 280/650 |
| 6,398,304 | B1 | * | 6/2002 | Chen et al. ..................... 297/327 |
| 6,513,827 | B1 | * | 2/2003 | Barenbrug ..................... 280/648 |
| 7,377,537 | B2 | * | 5/2008 | Li ................................... 280/650 |
| 7,686,323 | B2 | * | 3/2010 | Chen ............................. 280/642 |
| 7,694,996 | B2 | * | 4/2010 | Saville et al. ................. 280/642 |
| 7,891,696 | B2 | * | 2/2011 | Hanson ......................... 280/647 |
| 8,251,382 | B2 | * | 8/2012 | Chen et al. ................. 280/47.41 |
| 2004/0189076 | A1 | * | 9/2004 | Hanson et al. ........... 297/440.15 |
| 2008/0150247 | A1 | * | 6/2008 | Lake .......................... 280/47.41 |
| 2008/0224430 | A1 | * | 9/2008 | Vegt ................................ 280/29 |

FOREIGN PATENT DOCUMENTS

EP 0628448 B1 3/1998

* cited by examiner

*Primary Examiner* — Katy M Ebner
(74) *Attorney, Agent, or Firm* — Holland & Hart

(57) ABSTRACT

A stroller for disabled children, having a foldable underframe and a seat receiving means fixed to the underframe for receiving a seat with a backrest. The seat is fastened in the seat receiving means facing toward or away from the direction of travel. The seat receiving means is pivotable in relation to a horizontal plane for adjusting the inclination of the seat and is lockable in its respective position in relation to the underframe. The pivoting of the seat receiving means is provided by a pivoting device, which includes a control element, a locking element, and an actuator, which is in operative connection with the control element and the locking element.

20 Claims, 7 Drawing Sheets

STROLLER, ESPECIALLY REHAB STROLLER

TECHNICAL FIELD

The invention relates to a stroller having the following features:
a) a foldable underframe,
b) a seat receiving means which is fixed to the underframe for receiving a seat with a backrest,
c) the seat is able to be fastened in the seat receiving means as an alternative in the direction of travel F or against the direction of travel F,
d) the seat receiving means is
  $d_1$) arranged on the underframe so as to be pivotable in relation to the horizontal H for adjusting the inclination of the seat,
  $d_2$) lockable in its respective position in relation to the underframe,
e) the pivoting of the seat receiving means is effected by means of a pivoting device,
f) the pivoting device includes a control element, a locking element and an actuator which is in operative connection with the control element and the locking element.

BACKGROUND

Such a stroller is marketed under the name of "Kimba Spring" by Otto Bock as a stroller for disabled children.

US 2008/0224430 A1 discloses a stroller for very small children where a trough-shaped attachment can be inserted into an underframe.

The angle of inclination of the attachment, which said attachment assumes in the underframe, is adjustable.

U.S. Pat. No. 6,086,086 discloses a stroller for disabled children with an adjustable seat frame for disabled children. The underframe, on which the seat frame can be placed, is foldable.

Strollers used in the disabled sector are subject to a series of requirements in order to be able to enable optimum adaptation to the disabled child. Whilst the age range of children who are pushed in a stroller in general is limited to a few years, the age range of disabled children who use the same wheelchair is between 1 and approximately 12 years old. The seat, consisting of the sitting surface and the backrest, can be adapted precisely to the individual body proportions of the disabled child and consequently provides the best possible support. Seat depth, seat width, backrest height and footrest height are able to be adjusted steplessly many times. Adjustable pelvic supports and lateral defining supports enable an optimum position. So that, when pushing, eye contact can be maintained at all times with the child, the seat can be removed from the underframe and placed back on the underframe facing against the direction of travel. The inclination of the seat (tilt) can be adjusted from an active sitting posture through to the relaxation position where the child is lying. So that the stroller can be transported easily in a motor vehicle, it can be collapsed or folded up. In order to be able to detach the seat from the underframe, a seat receiving means is provided into which the seat can be clicked by means of a coupling and can be locked therein.

In order to be able to adjust the inclination of the seat, the seat receiving means is fastened on the underframe so as to be pivotable. The locking of the seat can be released by means of a release device which is fastened to the sliding bracket of the underframe and the angle of the seat can be adjusted. A disadvantage in this case is that the operator has to perform the unlocking with one hand and at the same time has to hold the seat securely with the other hand so that it does not pivot uncontrollably—in particular when the child is in the seat. Handling is consequently awkward and sometimes has to be undertaken by two persons, in particular in the case of larger and consequently heavier children.

Proceeding from said problem definition, the adjusting of the inclination of the seat in relation to the horizontal is to be simplified.

SUMMARY

To solve the problem, the afore-described stroller is distinguished by the following features:
g) the control element is arranged on the backrest,
h) the locking element is arranged on the underframe,
i) the actuator is incorporated into the seat receiving means.

By the control element being connected directly to the seat, the operator is also able to support the seat with the same hand with which he releases the locking element and is then able to perform the adjusting of the seat inclination one-handedly and to bring about the locking of the seat again without having to interrupt the supporting force.

The actuator is preferably a lever which is arranged on the underframe so as to be pivotable against the force of a spring, the pivoting movement of said lever preferably being introducible in particular by means of the control element.

If the control element is a rotary knob, handling is further simplified. The rotary knob can then be connected to the lever by means of a first cable pull and the actuator can then preferably be connected to the locking element in particular by means of a second cable pull.

A structurally particularly simple development is possible when at the end of the first cable pull facing away from the control element, a sliding block, which abuts against the lever, is slidingly guided in the seat under the sitting surface.

The lever is preferably realized in a substantially T-shaped manner such that it forms one portion pointing parallel to the direction of travel and two portions pointing transversely to the direction of travel and the sliding block abuts against one of the portions pointing transversely to the direction of travel in dependence on the direction of installation of the seat (facing in the direction of travel or facing against the direction of travel).

The locking element is preferably a telescopic device which operates according to the wrap-around principle, as is known for example from EP 0 628 448 B1, or is distributed as a telescopic cylinder.

BRIEF DESCRIPTION OF THE DRAWINGS

An exemplary embodiment of the invention is to be described below by way of a drawing, in which, in more detail.

DETAILED DESCRIPTION

Figure 7:
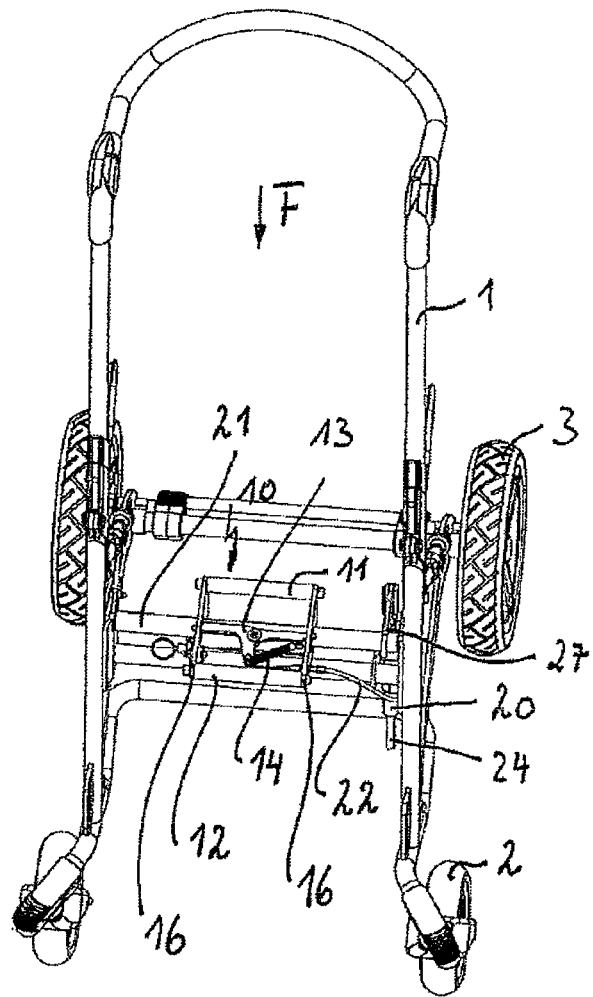
FIG. 7—shows the top view onto the underframe without a seat.

The wheelchair essentially consists of the underframe 1 on which the front and rear wheels 2, 3 are fastened. The seat 4, consisting of the backrest 9 and the sitting surface 6, is inserted in a removable manner in the underframe 1. The backrest 9 is strengthened by a strut 5. The foot support 8 is fastened to the sitting surface 6 so as to be vertically adjustable. The coupling 7, by way of which the seat 4 can be inserted into the seat receiving means 10 which is fastened on the underframe 1 so as to be pivotable, is fastened on the seat 4 below the sitting surface 6. The seat receiving means 10 is fastened fixedly on the transverse tube 21, which is mounted rotatably in the underframe 1, and consists of the rods 11, 12 which extend transversely with respect to each other and the two steering triangles 16 which connect said rods. The T-shaped lever 13, which realizes one portion 13 *a* which is parallel to the direction of travel F and two portions 13 *b*, 13 *c* which extend transversely thereto, is pivotably mounted in the seat receiving means 10. The lever 13 is pivotable in a clockwise manner (FIG. 7) against the force of the tension spring 14. The two ends of the portions 13 *b*, 13 *c* are guided in the steering triangles 16 which are screw-connected to the ends of the rods 11, 12.

The sliding block 18, which has a bolt 15 which protrudes away from the under surface of the seat 4, is guided in a connecting link 19 in the coupling 7. Depending on whether the seat 4 is inserted into the seat receiving means 7 facing in the direction of travel F or facing against the direction of travel F, the bolt 15 abuts against the portion 13*b* or the portion 13*c*. The sliding block 15 is connected to the rotary knob 17 by means of the first cable pull 26. When the rotary knob 17 is rotated, the effective length of the second cable pull 22 is shortened and the sliding block 18 is pushed against the force of the spring 23, as a result of which, by means of the bolt 15 which abuts against the portion 13*c* (cf. FIG. 5), the lever 13 is pivoted, the tension spring 14 being tensioned (cf. FIG. 6). The cable pull 22, which is supported on one of the steering triangles 16, is fastened on the portion 13*a* of the lever 13. By way of its other end, the cable pull 22 is connected to the release lever (not shown here) of the locking element 20, which is a telescopic cylinder which operates according to the Wrap-around principle, as is described, for example, in EP 0 628 448 B1. If the release element (not shown) is actuated, the telescopic cylinder can be extended. For this purpose, the piston rod 24 is connected at its one end to a lever 27 which is fastened on the transverse rod 21 which is mounted rotatably in the underframe 1. If the seat inserted into the seat receiving means 10 is pivoted, the transverse rod 21 is rotated and the piston rod 24 is pushed into the cylinder 20 or out of the cylinder.

If, once the desired seat inclination has been set, the rotary knob 17 is released, the pressure spring 23 pushes the bolt 15 and consequently the sliding block 18 back into its initial position, as a result of which the lever 13 is also rotated back into its initial position by means of the tension spring 14, such that the release element (not shown) on the telescopic cylinder 20 also springs back into its original position and further linear movement of the piston rod is prevented, as a result of which the seat is locked in its inclination.

Figure 1:
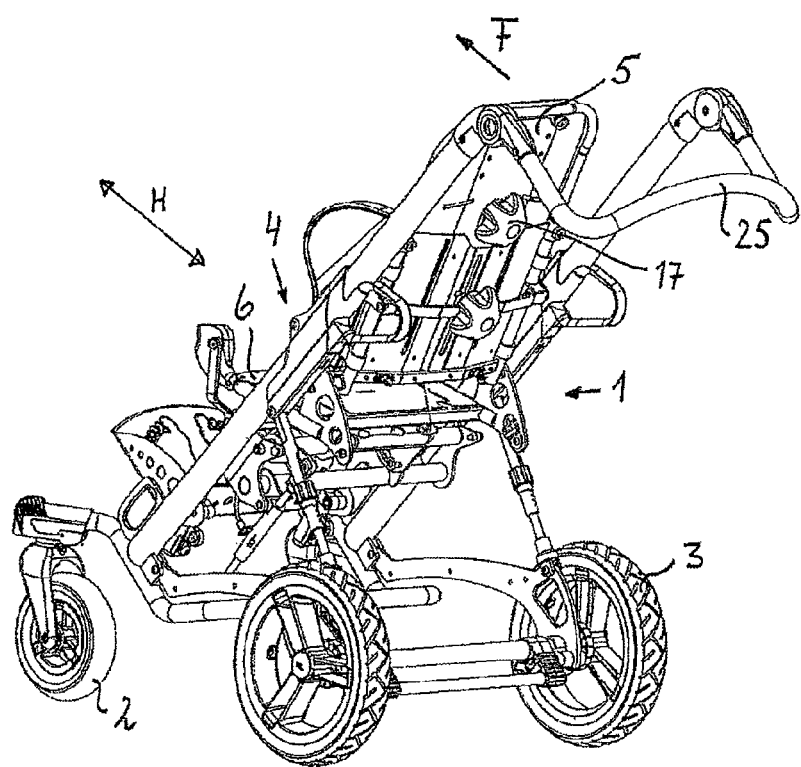
FIG. 1—shows the perspective representation of a stroller.
Figure 2:
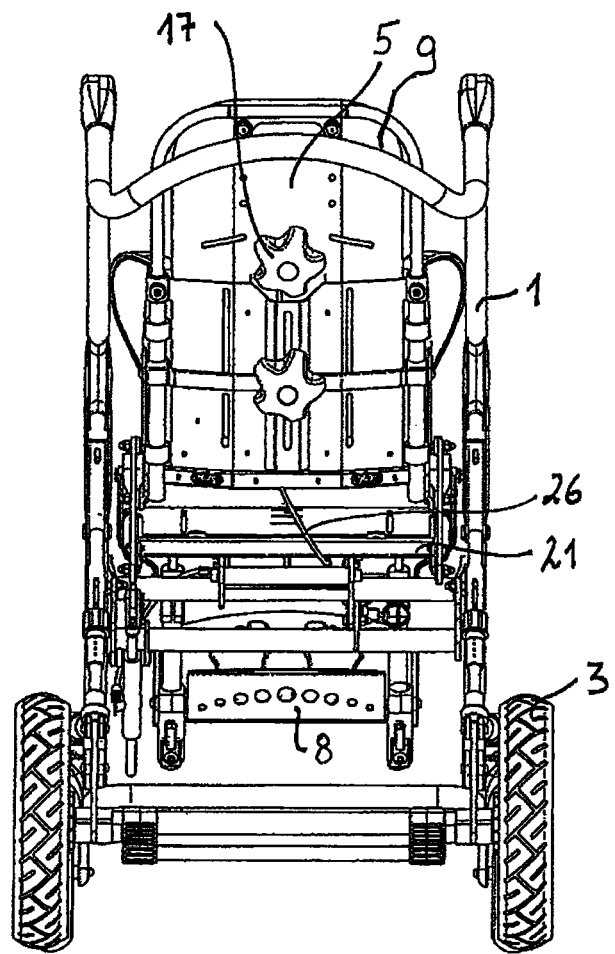
FIG. 2—shows the rear view of the stroller according to FIG. 1.
Figure 3:
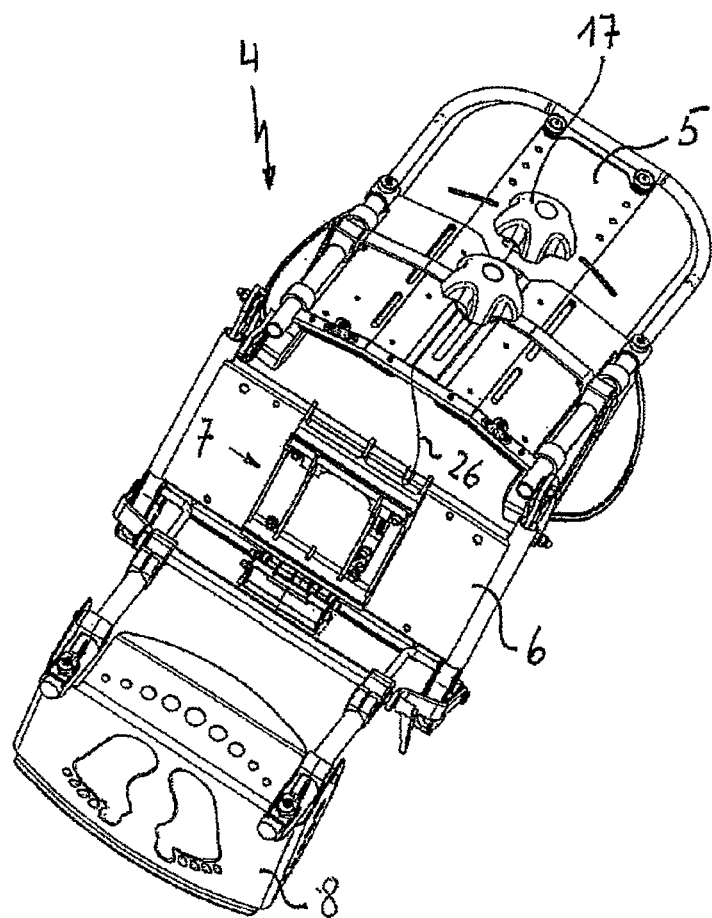
FIG. 3—shows the perspective representation of the seat seen from below.
Figure 4:
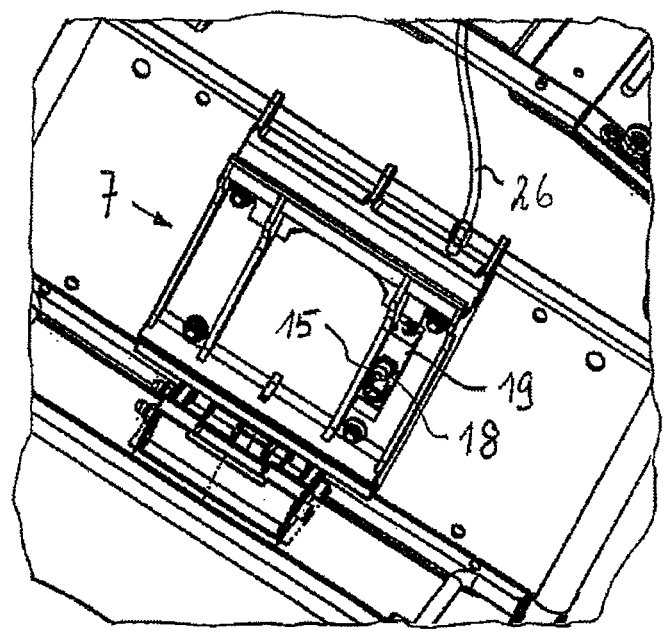
FIG. 4—shows a detail from FIG. 3.
Figure 5:
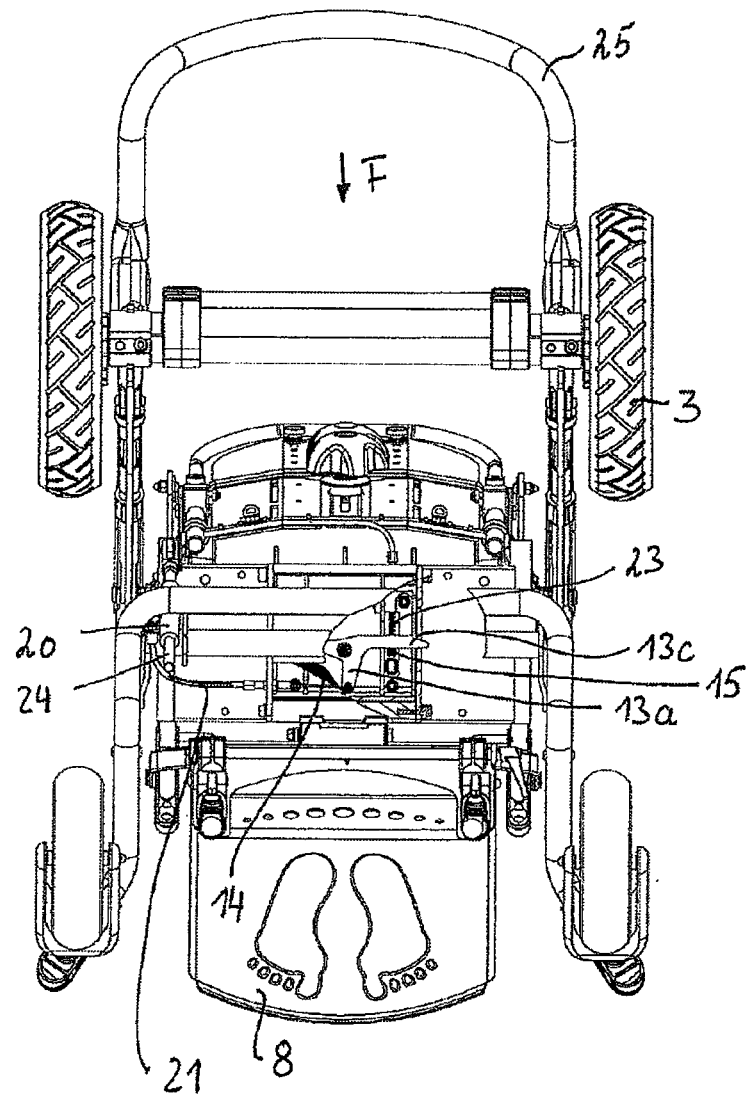
FIG. 5—shows the partially opened up bottom view of the stroller.
Figure 6:
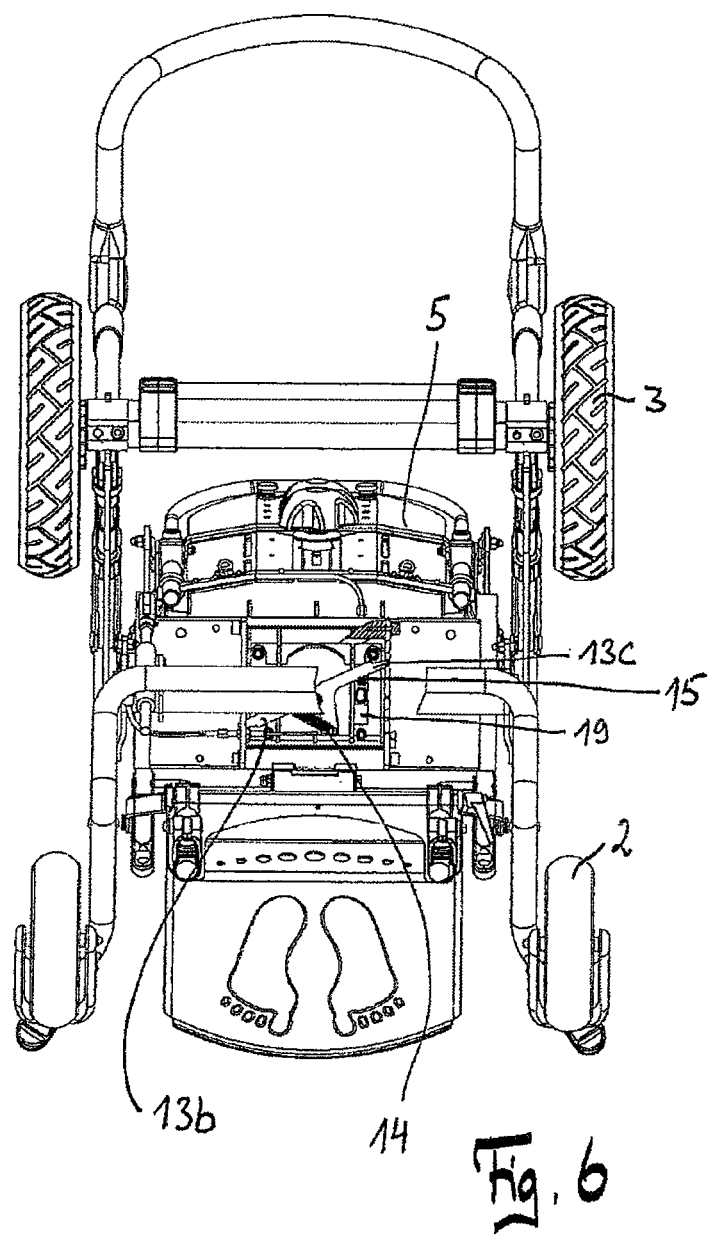
FIG. 6—shows another representation according to FIG. 5.

The portions 13*b*, 13*c* of the lever 13 are developed such that the sliding block 18 or the bolt 15 connected to said sliding block is positioned in dependence on the direction into which the seat 4 is inserted into the seat receiving means 7 and when the rotary knob 17 is rotated, the lever 13 is always rotated in a clockwise manner (with reference to the top view of the stroller). FIGS. 5 and 6 show the lever 13 from the bottom view of the stroller such that the lever 13, when the rotary element 17 is rotated, rotates in a counterclockwise manner. FIG. 5 shows the locked position of the seat and FIG. 6 shows the position in which the locking element 20 is released such that manual pivoting of the seat 4 is possible.

The inclination of the backrest 9 in relation to the sitting surface 6 is also adjustable. The sliding bracket 25, the height of which can be adapted to the anatomy of the person pushing the wheelchair, is arranged on the underframe 1 so as to be pivotable.

The invention claimed is:

1. A stroller, comprising:
 a foldable underframe,
 a seat receiver which is fixed to the underframe and configured to receive a seat, the seat having a backrest,
 wherein the seat is configured to be fastened in the seat receiver alternatively facing in a direction of travel or facing against the direction of travel,
 the seat receiver is
  arranged on the underframe so as to be pivotable in relation to a horizontal direction for adjusting the inclination of the seat, and
  lockable in its respective position in relation to the underframe,
 the pivoting of the seat receiver is effected by a pivoting device,
 the pivoting device includes a control element, a locking element and an actuator which is in operative connection with the control element and the locking element,
 the control element is arranged on the backrest,
 the locking element is arranged on the underframe,
 and the actuator is incorporated into the seat receiver.

2. Stroller according to claim 1, wherein the actuator is a lever which is arranged on the underframe so as to be pivotable against the force of a spring.

3. Stroller according to claim 2, wherein the pivoting movement of the lever is introducible by the control element.

4. Stroller according to claim 3, wherein the control element is a rotary knob.

5. Stroller according to claim 4, wherein the rotary knob is connected to the lever by a first cable pull.

6. Stroller according to claim 5, wherein the actuator is connected to the locking element by a second cable pull.

7. Stroller according to claim 5, wherein at an end of the first cable pull facing away from the control element, a sliding block, which abuts against the lever, is slidingly guided in the seat under a sitting surface of the seat.

8. Stroller according to claim 7, wherein the lever has a substantially T-shaped construction with two portions pointing transversely to the direction of travel and the sliding block abuts against one of the two portions in dependence on a direction of installation of the seat.

9. Stroller according to claim 1, wherein the locking element is a telescopic device which operates according to a wrapped spring principle.

10. Stroller according to claim 1, wherein said stroller is a stroller for disabled children.

11. A stroller, comprising:
 a seat having a backrest;
 a foldable underframe;
 a seat receiver fixed to the underframe and configured to receive the seat alternately facing in a direction of travel or facing against the direction of travel, the seat receiver being pivotable relative to a horizontal plane for adjusting an inclination of the seat relative to the underframe, the seat receiver being lockable in a pivoted position relative to the underframe;
 a control element positioned on the backrest;
 a locking element positioned on the underframe and operative to lock the seat relative to the underframe;

an actuator arranged in operative connection with the control element and the locking element, the actuator being incorporated into the seat receiver.

12. The stroller of claim 11, wherein the actuator is a lever which is pivotable against the force of a spring.

13. The stroller of claim 12, wherein the control element is operable to pivot the lever.

14. The stroller of claim 13, wherein the control element comprises a rotary knob.

15. The stroller of claim 14, wherein the rotary knob is connected to the lever by a first cable.

16. The stroller of claim 15, wherein the actuator is connected to the locking element by a second cable.

17. The stroller of claim 15, further comprising a sliding block positioned at an end of the first cable facing away from the control element, the sliding block abutting against the lever and being slidingly guided in the seat under a sitting surface of the seat.

18. The stroller of claim 17, wherein the lever comprises a substantially T-shaped construction with two portions pointing transversely to a direction of travel, and the sliding block abuts against one of the two portions depending on an installation direction of the seat.

19. The stroller of claim 11, wherein the locking element is a telescopic device operable according to a wrapped spring principle.

20. The stroller of claim 11, wherein the stroller is configured for use by disabled children.

* * * * *